United States Patent [19]
Polley

[11] Patent Number: 6,079,335
[45] Date of Patent: Jun. 27, 2000

[54] UNSPRUNG THIRD RAIL COLLECTOR BEAM SUPPORT FOR A SWING ARM PRIMARY SUSPENSION RAILWAY TRUCK

[75] Inventor: Richard B. Polley, Gahanna, Ohio

[73] Assignee: Buckeye Steel Castings Company, Columbus, Ohio

[21] Appl. No.: 09/255,327

[22] Filed: Feb. 23, 1999

[51] Int. Cl.$^7$ .................................................. B61F 5/26
[52] U.S. Cl. ..................... 105/218.2; 191/45 R; 191/49; 105/34.1
[58] Field of Search .................................. 105/34.1, 179, 105/218.2, 223; 191/45 R, 49

[56] References Cited

U.S. PATENT DOCUMENTS

| | | | |
|---|---|---|---|
| 1,766,639 | 6/1930 | Howe | 191/49 |
| 3,855,940 | 12/1974 | Pinto | 105/218.2 |
| 4,526,108 | 7/1985 | Spencer et al. | 191/49 |
| 5,454,456 | 10/1995 | McKinzie | 191/49 |

*Primary Examiner*—Mark T. Le
*Attorney, Agent, or Firm*—Banner & Witcoff, Ltd.

[57] ABSTRACT

There is an electric railway truck comprising an unsprung third rail collector beam for a swing arm primary suspension. The collector beam and attached current collector is mounted to the truck frame through the use of mounting adapters, links, and elastomeric bushings. Specifically, in the vicinity of the swing arm axle housings, the collector beam is secured to the mounting adapters which, in turn, are suspended below the respective axle housings by the links and accompanying elastomeric bushings. The torsional deflection of the elastomeric bushings permit the links to swing in the longitudinal direction, thereby accommodating the relatively larger angular and longitudinal axle housing motions created by a swing arm primary suspension.

16 Claims, 4 Drawing Sheets

UNSPRUNG THIRD RAIL COLLECTOR BEAM SUPPORT FOR A SWING ARM PRIMARY SUSPENSION RAILWAY TRUCK

BACKGROUND OF THE INVENTION

1. Field of the Invention

The present invention relates generally to electric railway trucks and more particularly to current collector beams for electric railway trucks incorporating swing arm primary suspensions.

2. Description of the Related Art

Self propelled electric railway trucks require a means to transmit remotely generated power from a trackside third rail to the truck mounted traction motors. One conventional means to accomplish this transfer is through the use of a current collector mounted to the railway truck. The current collector incorporates a shoe or paddle which runs against the electrically charged trackside third rail, which is usually mounted near ground level outboard of the running rails. The electric current from the electrically charged third rail travels from the shoe or paddle of the current collector to the traction motors.

It is highly desirable to minimize the relative motions between the current collector and the electrically charged third rail to insure the proper spatial relationship with the third rail. To achieve this proper relationship with the third rail, it is often desirable to mount the current collector on an unsprung truck member below the primary suspension. This is traditionally accomplished by extending a current collector beam longitudinally between the axle housings on each end of the truck. The current collector is typically fastened to the beam near the truck center line. The beam, constructed of a non-conductive material such as wood or plastic, provides electrical isolation between the current collector and the grounded truck structure.

Relative motions between the axles on opposite ends of the truck create both linear and angular motions between the current collector beam and the axle housing to which it is mounted. On trucks equipped with conventional primary suspensions the axle housing is restrained in a vertically upright alignment throughout the range of vertical, lateral and longitudinal motions. Under these conditions the range of linear and angular motions between the current collector beam and the axle housings are small enough to be accommodated with a simple elastomeric cushion at each end of the beam.

However, on trucks equipped with a swing arm primary suspension, a simple elastomeric cushion at each end of the beam will not suffice because of the presence of additional dynamic motions not encountered with conventional primary suspensions. With the swing arm primary suspension, the axle housing has an arm extending longitudinally inward toward the truck centerline and rotatably fixed to the truck frame via a pivot. The primary springs are located between the swing arm axle housing and the truck frame. In this arrangement, vertical deflection of the primary springs describes an arcuate motion of the axle about the swing arm pivot. Thus, a current collector beam to be used on a swing arm primary suspension must be able to accommodate the larger angular and longitudinal motions created by the arcuate motion in addition to the usual vertical, lateral and longitudinal motions incurred with conventional suspensions.

SUMMARY OF THE INVENTION

Accordingly, an object of the present invention is to provide an unsprung collector beam with a swing arm primary suspension railway truck. Another object of the invention is to provide a current collector beam for a swing arm primary suspension with the required freedom of motion and minimal restrictive forces while still maintaining the unsprung current collector in the optimal spatial relationship to the wayside third rail through the entire range of dynamic truck motions.

Briefly, the present invention involves an electric railway truck comprising a swing arm primary suspension and an unsprung third rail collector beam. The unsprung collector beam and attached current collector are mounted to the truck assembly through the use of mounting adapters, links, and elastomeric bushings. Specifically, in the vicinity of the swing arm axle housings, the collector beam is secured to the mounting adapters which, in turn, are suspended below the respective axle housings by the links and accompanying elastomeric bushings. In use, torsional deflection of the elastomeric bushings permit the links to swing in the longitudinal direction, thereby accommodating the relatively larger angular and longitudinal axle housing motions created by a swing arm primary suspension.

The full range of objects, aspects and advantages of the invention are only appreciated by a full reading of this specification and a full understanding of the invention. Therefore, to complete this specification, a detailed description of the invention and the preferred embodiments follow, after a brief description of the drawings.

BRIEF DESCRIPTION OF THE DRAWINGS

The preferred embodiments of the invention will be described in relation to the accompanying drawings. In the drawings, the following figures have the following general nature.

In the accompanying drawings, like reference numbers are used throughout the various figures for identical structures.

DESCRIPTION OF THE PREFERRED EMBODIMENTS

Figure 1:
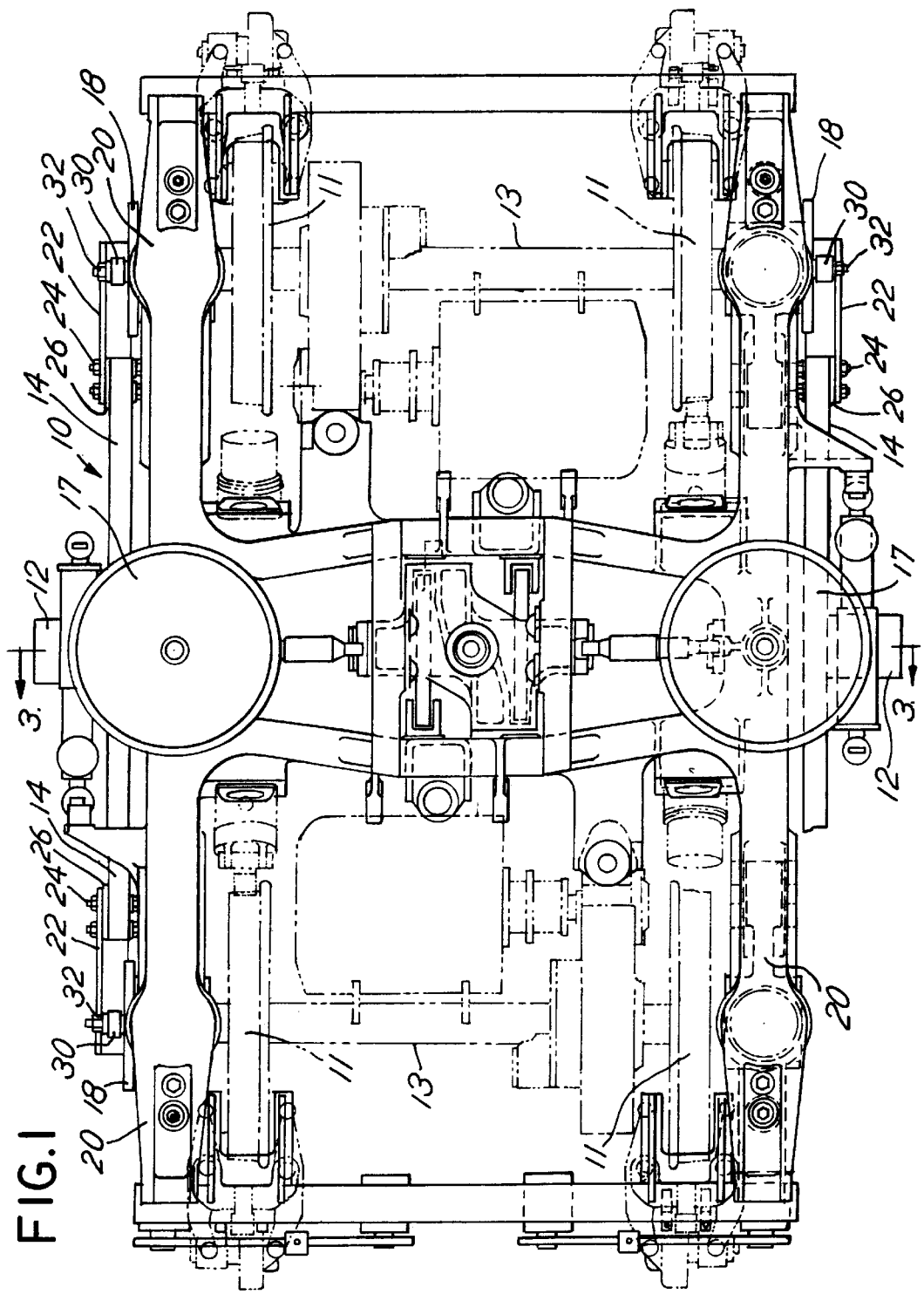
FIG. 1 is a top plan view of the railway truck of the present invention.
Figure 2:
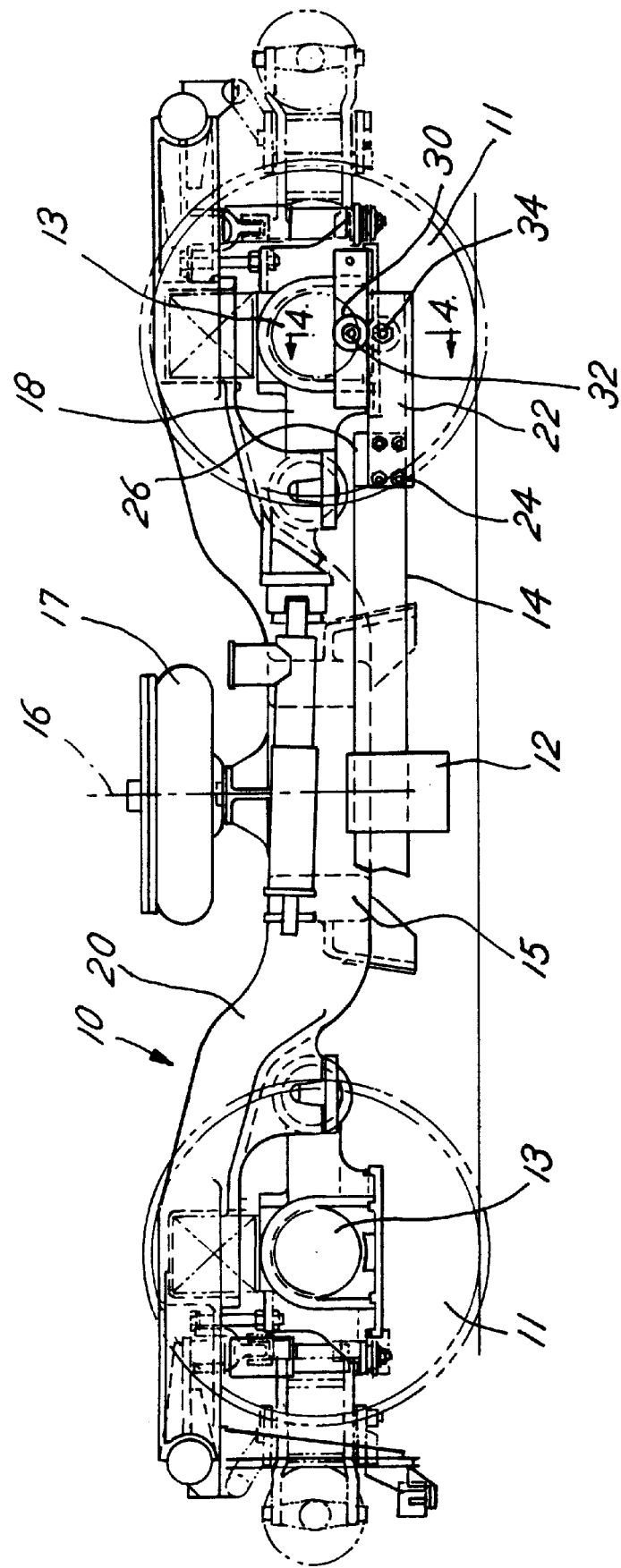
FIG. 2 is a side elevation view of the truck of FIG. 1.
Figure 3:
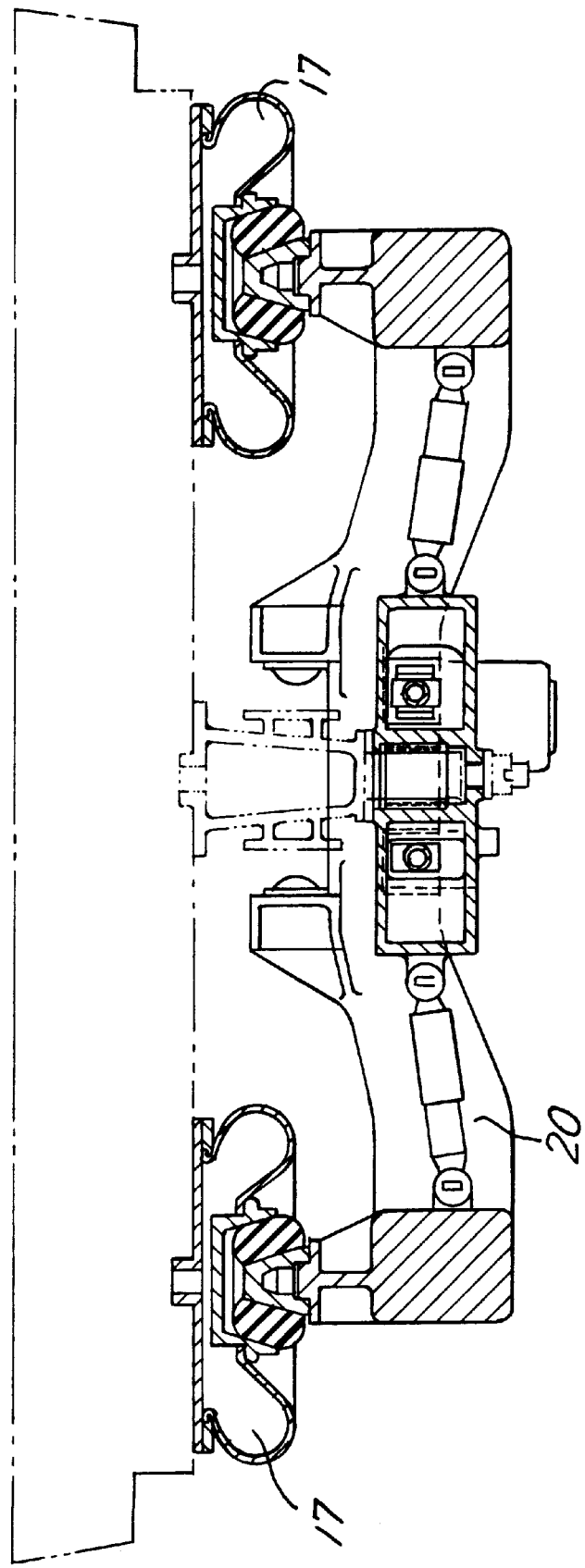
FIG. 3 is a cross-section view at line 3—3 of the truck of FIG. 1.

Referring to FIGS. 1–3, there is depicted a preferred embodiment of an electric railway truck of the present invention incorporating a preferred third rail collector beam support. As conventional, the electric truck 10 includes wheel sets which include two wheels 11 spaced transversely from each other and joined by transversely extending axles 13. Supported on the wheel sets is the truck frame 20 on which is mounted the secondary suspension 17.

A preferred electric truck 10 also includes a current collector 12, generally illustrated, which is mounted to a non-conductive current collector beam 14 at or near the truck centerline 16. One current collector 12 is mounted on each side of the truck 10. The current collector 12 is typically a shoe or paddle which runs against the electrically charged trackside third rail and receives the electric current from the charged rail. The current collector beam 14 extends longitudinally from the truck centerline 16 to the vicinity of the swing arm axle housings 18 on opposite ends of the truck frame 20 assembly. The current collector beam 14 is secured at each end of the truck frame 20 to a preferred mounting adapter 22. The beam 14 is removably fastened to the mounting adapter 22 through the use of threaded fasteners 24 which extend through slotted holes in mating serrated plates 26. The mating serrated plates 26 with slotted holes provide for vertical adjustment of the collector beam 14 to compensate for wheel wear.

Figure 4:
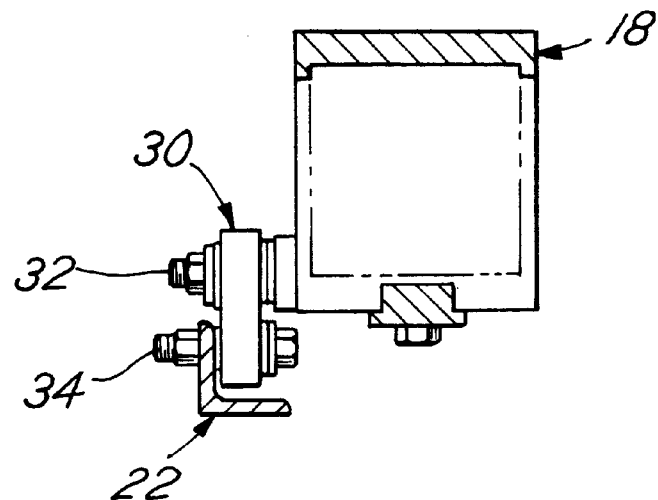
FIG. 4 is cross-section view at line 4—4 of the truck of FIG. 2.
Figure 5:
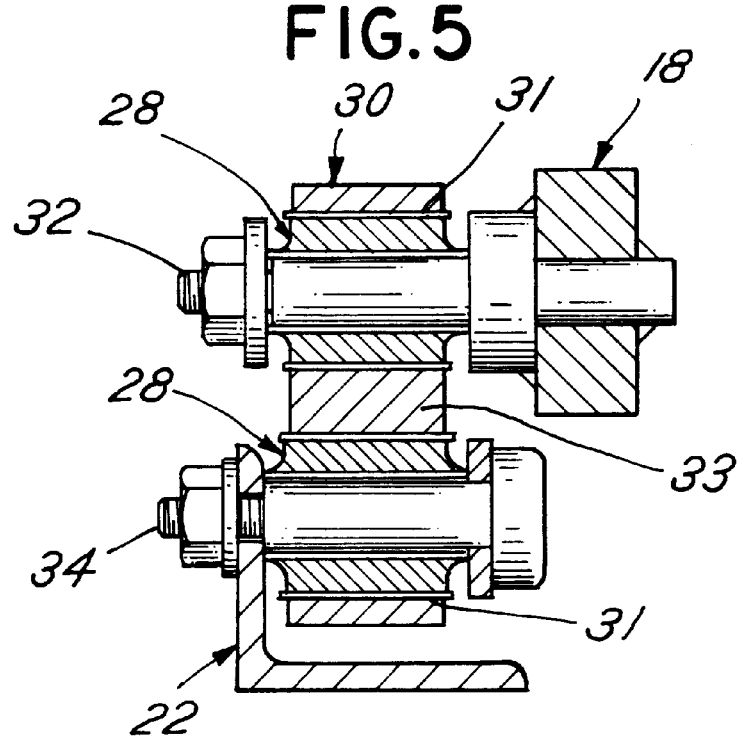
FIG. 5 is an enlarged cross-section view of a portion of FIG. 4.

Referring to FIGS. 2, 4 and 5, the mounting adapters 22 are preferably made from steel and have an L-shaped cross-section. Other cross sections of the mounting adapters 22 may be used and are contemplated and are thus considered within the scope of the present invention. The mounting adapters 22 are suspended and supported below the respective axle housings 18 by means of a link 30, preferably a dog bone type link, two elastomeric bushings 28, and fasteners 32 and 34. Thus, at one end the mounting adapter 22 defines a plurality of holes for mounting of the adapter to the serrated plates 26. At the opposing end the adapter defines a single hole for mounting of the adapter to the swing arm axle housing 18 via the elastomeric bushings 28, the link 30, and the fasteners 32 and 34.

As most preferred, the connection between the mounting adapter 22 and the axle housing 18 comprises the dog bone type link 30 and two elastomeric bushings 28. It is contemplated, however, that other links and bushings which permit longitudinal motion of the collector beam while insuring the return of the beam to its original position may be used and are considered within the spirit and scope of the present invention. As exemplified in FIGS. 4 and 5, the link 30 is secured at one end to the axle housing 18 through use of the bushing 28 and the fastener 32. At the opposing end, the link 30 is secured to the mounting adapter 22 through the use of the bushing 28 and the fastener 34. The link 30 defines a pair of eyelets or apertures 31 sized to receive the bushings 28, and a link body 33. The bushings 28, in turn, are sized to receive the fasteners 32 and 34. As most preferred, the elastomeric bushings 28 have a soft torsional spring rate and a stiff radial spring rate. These torsional properties of the elastomeric bushings 28 permit the links 30 to swing longitudinally. Advantageously, the use of the link 30 in combination with the torsional properties of the bushings 28 accommodate the relatively larger axle housing motions encountered with a swing arm primary suspension. Significantly, gravitational forces combine with the torsional restoring spring rate of the elastomeric bushings to maintain the current collector beam in the lowest, most stable position directly below the axle housings until overcome by the forces acting on the swing arm axle housing and insure a return to this lowest, most stable equilibrium position when these forces are removed.

The preferred embodiments of the invention are now described as to enable a person of ordinary skill in the art to make and use the same. Variations of the preferred embodiment are possible without being outside the scope of the present invention. Therefore, to particularly point out and distinctly claim the subject matter regarded as the invention, the following claims conclude the specification.

What is claimed is:

1. A railway truck comprising:

a truck frame, a swing arm primary suspension mounted to the truck frame, a current collector beam mounted below the swing arm primary suspension, and means for suspending the collector beam to the swing arm primary suspension.

2. The railway truck of claim 1 wherein the means for suspending the collector beam comprises a mounting adapter secured to the current collector beam, and a link connecting the swing arm primary suspension to the mounting adapter.

3. The railway truck of claim 2 wherein the link further comprises at least one elastomeric bushing.

4. The railway truck of claim 1 wherein the swing arm primary suspension further comprises a swing arm axle housing, the collector beam being mounted to the swing arm axle housing.

5. The railway truck of claim 1 wherein the collector beam is mounted to serrated plates having slotted holes to provide for vertical adjustment of the collector beam.

6. The railway truck of claim 3 wherein the at least one elastomeric bushing is two bushings mounted to the link.

7. The railway truck of claim 1 wherein the current collector beam is unsprung.

8. A railway truck comprising:

a truck frame, a swing arm primary suspension mounted to the truck frame, a mounting plate mounted to the swing arm primary suspension by a link, the mounting plate suspended below the swing arm primary suspension, and a beam for mounting an electric current collector, the beam mounted to the mounting plate.

9. The railway truck of claim 8 wherein the link further comprises at least one elastomeric bushing.

10. The railway truck of claim 9 wherein the at least one elastomeric bushing is two bushings.

11. The railway truck of claim 8 wherein the beam is mounted to serrated plates defining slotted holes to provide for vertical adjustment of the beam.

12. The railway truck of claim 8 wherein the swing arm primary suspension further comprises a swing arm axle housing, the beam being mounted to the swing arm axle housing.

13. A railway truck comprising:

a truck frame, a swing arm axle housing mounted to the truck frame, a mounting plate mounted to the swing arm axle housing by a link, the mounting plate suspended below the swing arm axle housing, the link further comprising at least one elastomeric bushing, and a current collector beam mounted to the mounting plate.

14. The railway truck of claim 13 wherein the at least one elastomeric bushing is two bushings.

15. The railway truck of claim 13 wherein the current collector beam is mounted to serrated plates defining slotted holes to provide for vertical adjustment of the collector beam.

16. The railway truck of claim 13 wherein the current collector beam is unsprung.

* * * * *